(12) United States Patent
Lim et al.

(10) Patent No.: US 8,869,074 B2
(45) Date of Patent: Oct. 21, 2014

(54) MOBILE TERMINAL

(75) Inventors: Kwanghyuk Lim, Seoul (KR); Seungwoo Nam, Seoul (KR); Inho Kang, Seoul (KR); Soojin Kim, Seoul (KR); Taejeong Seo, Seoul (KR); Byoungpyo Moon, Seoul (KR); Gahee Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 13/241,161

(22) Filed: Sep. 22, 2011

(65) Prior Publication Data
US 2012/0309464 A1 Dec. 6, 2012

(30) Foreign Application Priority Data
Jun. 1, 2011 (KR) .................. 10-2011-0052608

(51) Int. Cl.
*G06F 3/048* (2013.01)
*H04M 1/725* (2006.01)

(52) U.S. Cl.
CPC ...... *H04M 1/72522* (2013.01); *H04M 1/72525* (2013.01); *H04M 1/72547* (2013.01); *H04M 2250/64* (2013.01)
USPC ........... 715/864; 715/810; 715/835; 715/700; 345/169; 455/422.1; 455/566

(58) Field of Classification Search
USPC ......... 715/700, 748, 749, 764, 781, 810, 835, 715/864; 345/169; 455/422.1, 566
See application file for complete search history.

(56) References Cited

U.S. PATENT DOCUMENTS

| | | | |
|---|---|---|---|
| 6,928,542 B2* | 8/2005 | Wen et al. ................. | 713/2 |
| 6,961,944 B2* | 11/2005 | Chew et al. ................ | 719/328 |
| 2005/0076088 A1* | 4/2005 | Kee et al. .................. | 709/206 |
| 2006/0010314 A1* | 1/2006 | Xu .......................... | 713/2 |
| 2006/0010433 A1* | 1/2006 | Neil ........................ | 717/138 |
| 2008/0318616 A1* | 12/2008 | Chipalkatti et al. ........ | 455/550.1 |
| 2009/0187848 A1* | 7/2009 | Murtagh .................... | 715/781 |
| 2010/0146442 A1* | 6/2010 | Nagasaka et al. .......... | 715/810 |
| 2010/0275003 A1* | 10/2010 | Hsu et al. ................. | 713/2 |
| 2011/0288932 A1* | 11/2011 | Marks et al. ............... | 705/14.49 |
| 2012/0089992 A1* | 4/2012 | Reeves et al. .............. | 719/318 |
| 2012/0110496 A1* | 5/2012 | Lee et al. .................. | 715/778 |
| 2012/0240236 A1* | 9/2012 | Wyatt et al. ............... | 726/25 |

FOREIGN PATENT DOCUMENTS

| | | |
|---|---|---|
| GB | 2409786 | 7/2005 |
| JP | 2007336229 | 12/2007 |
| KR | 10-2006-0124047 | 12/2006 |
| KR | 10-2010-0024621 | 3/2010 |
| KR | 10-2010-0043434 | 4/2010 |
| WO | 01/61470 | 8/2001 |
| WO | 2007/127968 | 11/2007 |
| WO | 2008/077087 | 6/2008 |

OTHER PUBLICATIONS

Korean Intellectual Property Office Application No. 10-2011-0052608, Notice of Allowance dated Nov. 21, 2012, 2 pages.

* cited by examiner

*Primary Examiner* — Xiomar L Bautista
(74) *Attorney, Agent, or Firm* — Lee, Hong, Degerman, Kang & Waimey

(57) ABSTRACT

A mobile terminal and a method of controlling the mobile terminal are disclosed. In the mobile terminal, at least one second application executable in a second operating system different from a first operating system can be searched and provided among at least one first application executable in the first operating system. Accordingly, it is possible to provide a user interface for efficiently managing applications so as to be appropriate for various operating systems.

19 Claims, 22 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Patent Application No. 10-2011-0052608, filed on Jun. 1, 2011, the contents of which are hereby incorporated by reference herein in its entirety.

BACKGROUND

1. Field

The present invention relates to a mobile terminal and a method of controlling the mobile terminal, and more particularly, to a mobile terminal, which can manage applications so as to be appropriate for various operating systems, and a method of controlling the mobile terminal.

2. Related Art

Recently, various functions have been provided to users according to a remarkable advancement of software and hardware in various electronic device fields including mobile terminals.

Thus, the necessity of developing and supplying of multiple user interfaces allowing users to easily and effectively control a mobile terminal providing diverse, complicated functions is increasing.

SUMMARY

An object of the present invention is to provide a mobile terminal, which can manage applications so as to be appropriate for various operating systems, and a method of controlling the mobile terminal.

Another object of the present invention is to provide a mobile terminal, which allows a user to easily re-install an already installed application if they want to, and a method for controlling the mobile terminal.

Still another object of the present invention is to provide a mobile terminal, which allows the user to check whether an application installed based on the current operating system is executable in another operating system that the user wants to switch to, and a method for controlling the mobile terminal.

Yet another object of the present invention is to provide a mobile terminal, which can recommend an application currently in use to a user who uses an electronic device running on a different operating system.

To achieve the above objects, according to one aspect of the present invention, there is provided a mobile terminal, comprising: a display unit; a memory that stores a first operating system and a first application executable in the first operating system; and a controller that displays the at least one first application on the display unit, and searches at least one second application respectively corresponding to the at least one first application and executable in a second operating system different from the first operating system, and displays the same on the display unit.

According to another aspect of the present invention, there is provided a mobile terminal, comprising: a display unit; a memory that stores a first operating system and a first application executable in the first operating system; and a controller that displays the at least one first application on the display unit, and searches at least one second operating system, different from the first operating system, supporting the at least one first application, and displays an identifier indicating the at least one second operating system so as to correspond to the at least one first application.

According to still another aspect of the present invention, there is provided a method for controlling a mobile terminal, the method comprising: searching and displaying, from a memory storing a first operating system, at least one first application executable in the first operating system; searching, among the at least one first application, at least one second application executable in a second operating system different from the first operating system; and displaying the at least one second application.

According to yet another aspect of the present invention, there is provided a method for controlling a mobile terminal, the method comprising: searching and displaying, from a memory storing a first operating system, at least one first application executable in the first operating system; searching at least one second operating system, different from the first operating system, supporting the at least one first application between the first operating system; and displaying an identifier indicating the at least one second operating system so as to correspond to each of the at least one first application.

Details of other exemplary embodiments are included in the detailed description and drawings.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION

Figure 1:
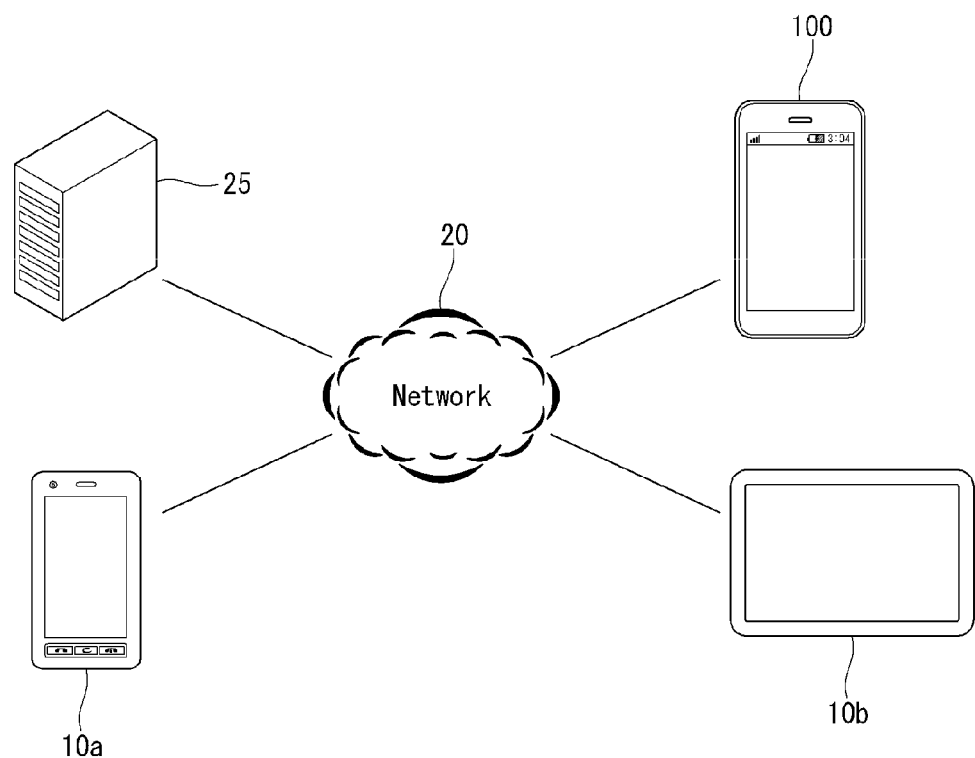
FIG. 1 is a view schematically illustrating a system environment to which the present invention is applicable.

The above and other aspects, features and advantages of the present invention will be more apparent from the following description when taken in conjunction with the accompanying drawing. Like reference numerals designate like elements throughout the specification. Further, detailed descriptions of well-known functions and structures incorporated herein may be omitted to avoid obscuring the subject matter of this document.

Hereinafter, a mobile terminal pertaining to the present invention will be described in more details with reference to the drawings. In the following description, suffixes "module" and "unit" of constituent elements are given or used for easily describing a specification, instead of having a distinctive meaning or function.

The mobile terminal described in the present invention includes, for example, mobile phones, smart phones, computers, notebook computers, digital broadcasting terminals, PDAs (Personal Digital Assistants), PMPs (Portable Multimedia Player), navigation devices, and the like.

FIG. 1 is a view schematically illustrating a system environment to which the present invention is applicable.

Referring to FIG. 1, the system environment to which the present invention is applicable includes a mobile terminal 100 according to one exemplary embodiment of the present invention, external electronic devices 10a and 10b placed external to the mobile terminal 100, a network 20, and a server 25 existing on the network 20.

As shown in FIG. 1, the mobile terminal 100 and the external electronic devices 10a and 10b can communicate with each other by wireless or wired communication protocols.

In this document, the method of communication between the mobile terminal 100 and the external electronic devices 10a and 10b is not limited. The technical spirit of this document is applicable to all the existing wireless communication protocols between electronic devices and all communication protocols that will emerge in the future.

For example, the mobile terminal 100 and the external electronic devices 10a and 10b can communicate with each other by communication protocols, such as UPnP, DLNA, and WiFi.

Also, the mobile terminal 100 and the external electronic devices 10a and 10b can communicate via the network 20 or by a short-range communication protocol, for example.

Moreover, the mobile terminal 100 and the external electronic devices 10a and 10b can communicate with the network 20. For instance, the mobile terminal 100 and the external electronic devices 10a and 10b can receive information about applications from the server 25 existing on the network 20.

Examples of the network include a mobile communication network, wired internet, wireless internet, and a broadcast network.

The mobile terminal 100 and the external electronic devices 10a and 10b may be fixed terminals or mobile terminals.

Examples of the mobile terminal 100 and the external electronic devices 10a and 10b may include a mobile phone, a smartphone, a computer, a laptop computer, a digital broadcast terminal, a personal digital assistant (PDA), a portable multimedia player (PMP), a navigator, and a mobile internet device (MID).

The mobile terminal 100 pertaining to the present invention will now be described in more details with reference to the drawings. In the following description, suffixes "module" and "unit" of constituent elements are given or used for easily describing a specification, instead of having a distinctive meaning or function.

Figure 2:
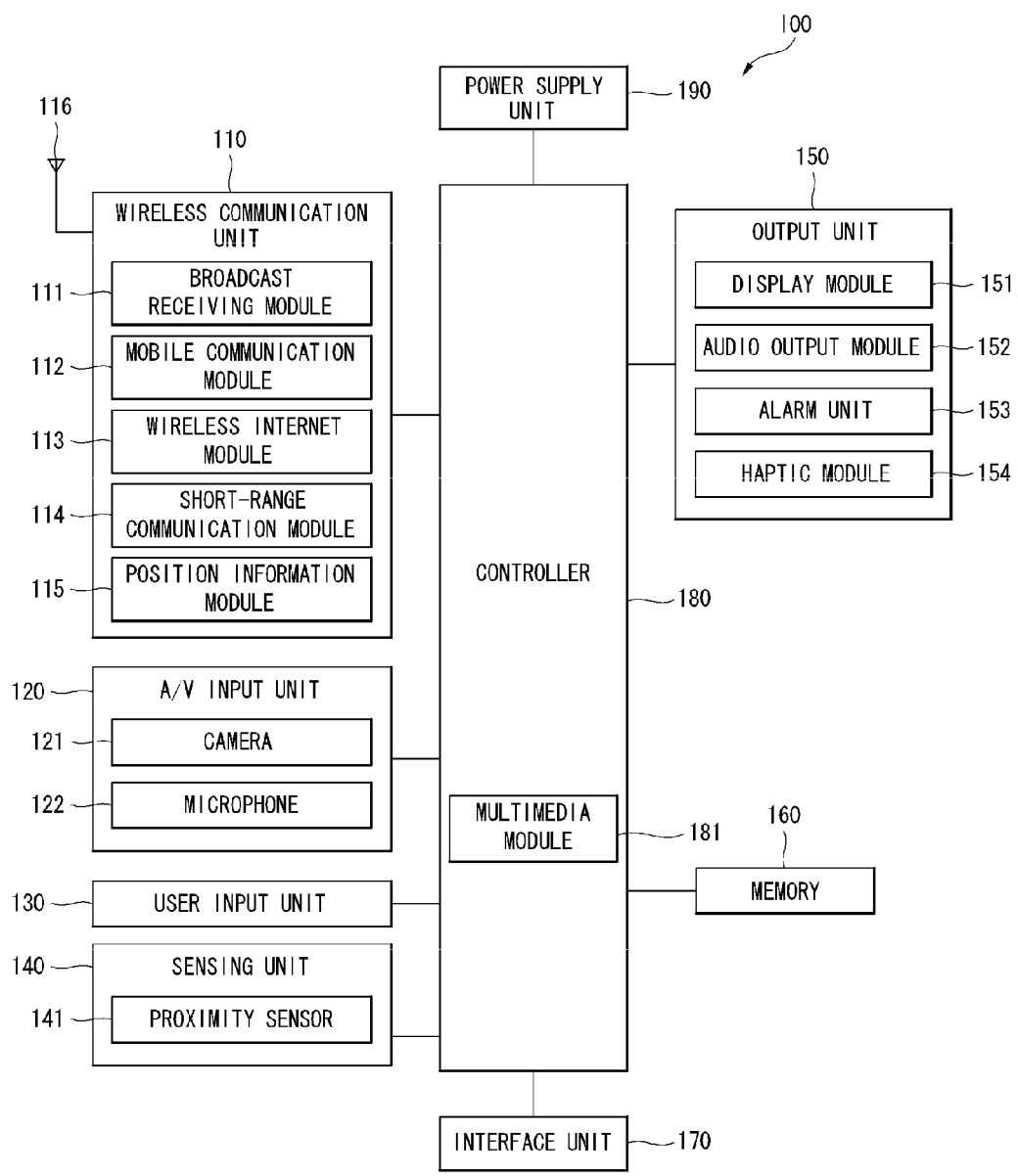
FIG. 2 is a block diagram of a mobile terminal according to one exemplary embodiment of the present invention.

FIG. 2 is a block diagram of a mobile terminal 100 according to an exemplary embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 2 shows the mobile terminal as having various components, but implementing all of the illustrated components is not a requirement. Greater or fewer components may alternatively be implemented.

In addition, the wireless communication unit 110 generally includes one or more components allowing radio communication between the mobile terminal 100 and a wireless communication system or a network in which the mobile terminal is located. For example, in FIG. 2, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems. In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

Also, the location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 2, the NV input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the wireless communication unit 110. Two or more cameras 121 may also be provided according to the configuration of the mobile terminal.

In addition, the microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. In FIG. 2, the sensing unit 140 also includes a proximity sensor 141.

In addition, the output unit 150 is configured to provide outputs in a visual, audible, and/or tactile manner. In the example in FIG. 2, the output unit 150 includes the display unit 151, an audio output module 152, an alarm unit 153, a haptic module 154, and the like. In more detail, the display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 can function as both an input device and an output device. The touch sensor may have a form of a touch film, a touch sheet, a touch pad, and the like.

Further, the touch sensor may be configured to convert pressure applied to a particular portion of the display unit 151 or a change in the capacitance or the like generated at a particular portion of the display unit 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 2, the proximity sensor 141 may be disposed within or near the touch screen. In more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

Further, the audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

In addition, the haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 2, the controller 180 also includes a multimedia module 181 for reproducing multimedia data. The multimedia module 181 may be configured within the controller 180 or may be configured to be separated from the controller 180. The controller 180 can also perform a pattern recognition processing to recognize a handwriting input or a picture drawing input performed on the touch screen as characters or images, respectively.

Also, the power supply unit 190 receives external power or internal power and supplies appropriate power required for operating respective elements and components under the control of the controller 180. Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 3:
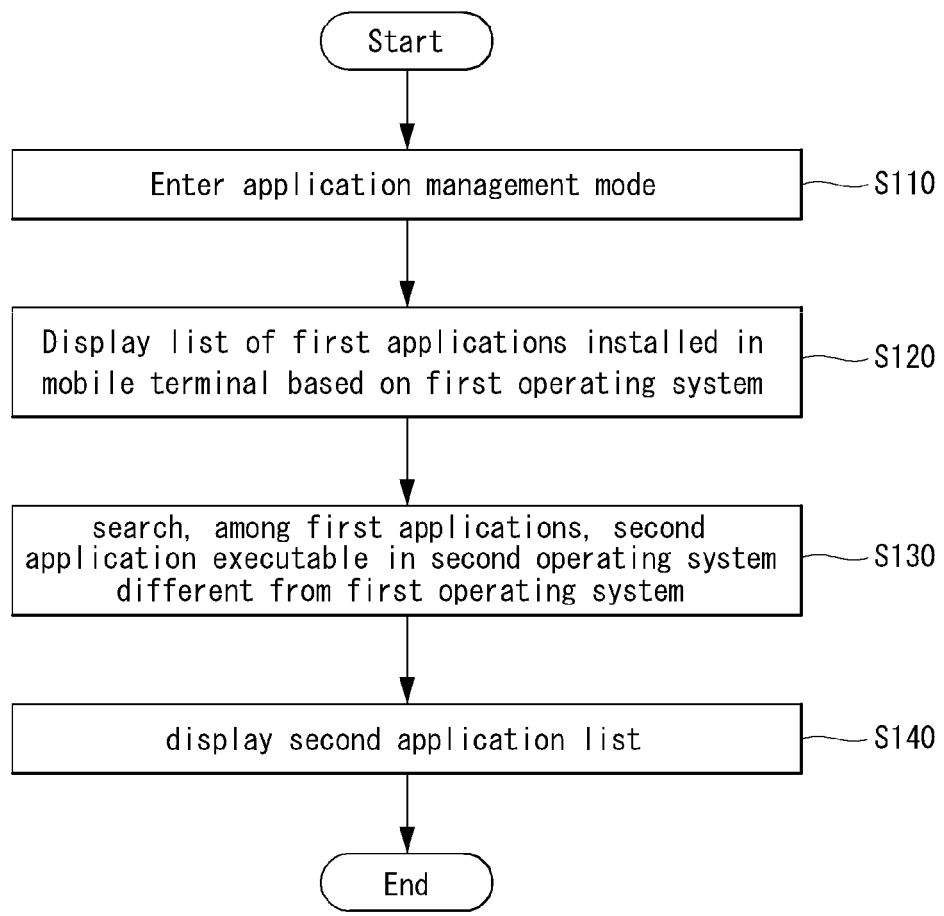
FIG. 3 is a flowchart for explaining a method of controlling a mobile terminal according to one exemplary embodiment of the present invention.

FIG. 3 is a flowchart for explaining a method of controlling a mobile terminal according to one exemplary embodiment of the present invention. FIGS. 4 to 10 are views showing one example of the method of controlling a mobile terminal according to the exemplary embodiment of FIG. 3. This controlling method is performed under the control of the controller 180.

Hereinafter, a description will be given with reference to FIG. 3 and FIGS. 4 to 10.

The memory 160 of the mobile terminal 100 can store a certain operating system (hereinafter, referred to as a 'first operating system') and at least one first application installed to be executable on the first operating system.

The controller 180 can enter the application management mode to check any application executable in a second operating system different from the first operating system among the at least one first application in accordance with user's specific operation (S110).

The applications refer to various kinds of applications (such as website browsing, content download, multimedia messaging (MMS)) running on a operating system in the mobile terminal 100 or in an electronic device (for example, a desktop computer, a laptop, etc.) including the mobile terminal 100, and may contain an execution file for executing the applications.

The operating system refers to control means that functions to control the overall operation of the mobile terminal 100 or an electronic device including the mobile terminal 100. The operating system for mobile terminals may include Android, Symbian OS, Linux Mobile, iOS (iPhone OS), BlackBerry OS, Window Mobile, bada, and so on. In addition to the operating systems for mobile terminals, PC operating systems may include Microsoft Window, Mac OS, Linux, and so on.

An application specialized to the specification of a specific operating system may not be shared in other operating systems. That is, an iOS-based application cannot be executed in an Android-based terminal. Accordingly, even the same application is installed and executed differently for different terminals depending on the type of operating system on which a terminal is running.

Therefore, there is a need to check whether individually the applications installed in the current mobile terminal 100 area also available for other mobile terminals.

Figure 4:
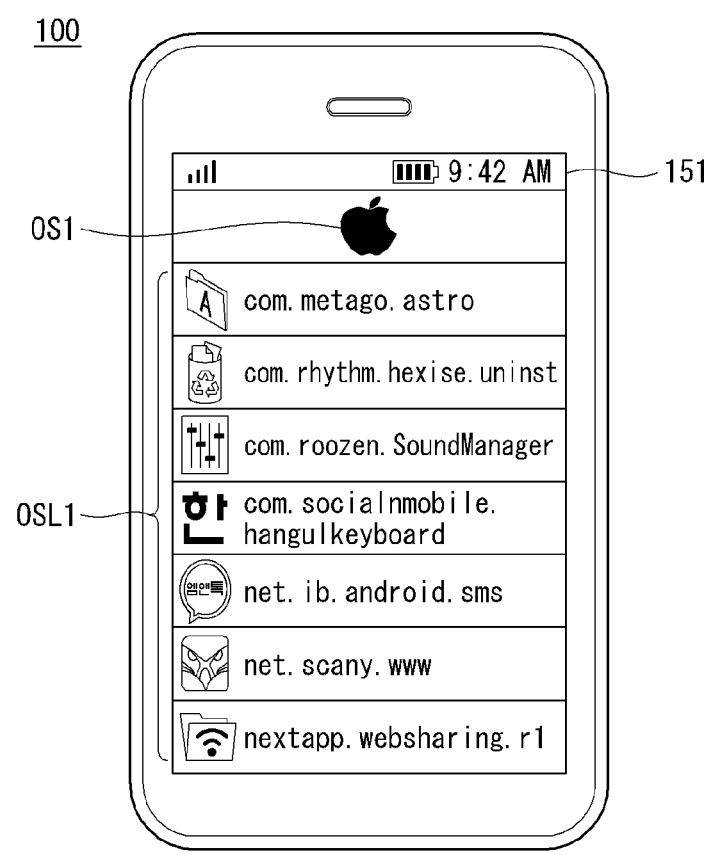
FIGS. 4 to 10 are views showing one example of the method of controlling a mobile terminal according to the exemplary embodiment of FIG. 3.

Referring to FIG. 4, the controller 180 can provide and display all the applications installed in the current mobile terminal 100 as a single list on the display unit 151 in the application management mode (S120).

That is, the controller 180 can display, on the display unit 151, a list OSL1 of the first applications installed in the mobile terminal 100 based on the first operating system upon receipt of a specific user operation.

The specific user operation may be an operation for selecting a specific button in the application management mode. The specific button may correspond to a command associated with searching for all the applications installed in the mobile terminal 100.

Besides, the controller 180 can update the versions of the applications in the application management mode, or delete the applications, or group a particular application and another application together to manage them in one folder.

Moreover, the controller 180 can search, among the first applications, a second application executable in a second operating system different from the first operating system (S130).

For example, the first operating system may be iOS, and the second operating system Android. The controller 180 can search applications executable on Android among the iOS-based first applications installed in the mobile terminal 100.

Figure 5:
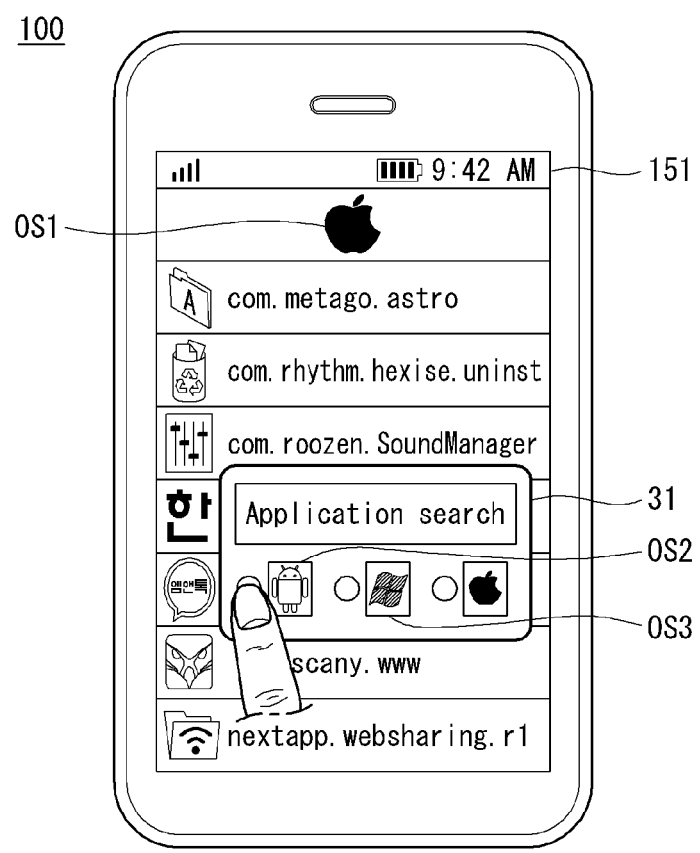

Referring to FIG. 5, to search an application executable on the second operating system among the at least one first application based on the first operating system, the controller 180 can display, on the display unit 151, a menu screen 31 for selecting any one of the at least one second operating system.

For example, the menu screen 31 may contain the icons indicating the at least one second operating system (OS2: Android, OS3: Windows Mobile) as well as the first operating system (iOS) on which the current mobile terminal 100 is running.

Figure 6A:
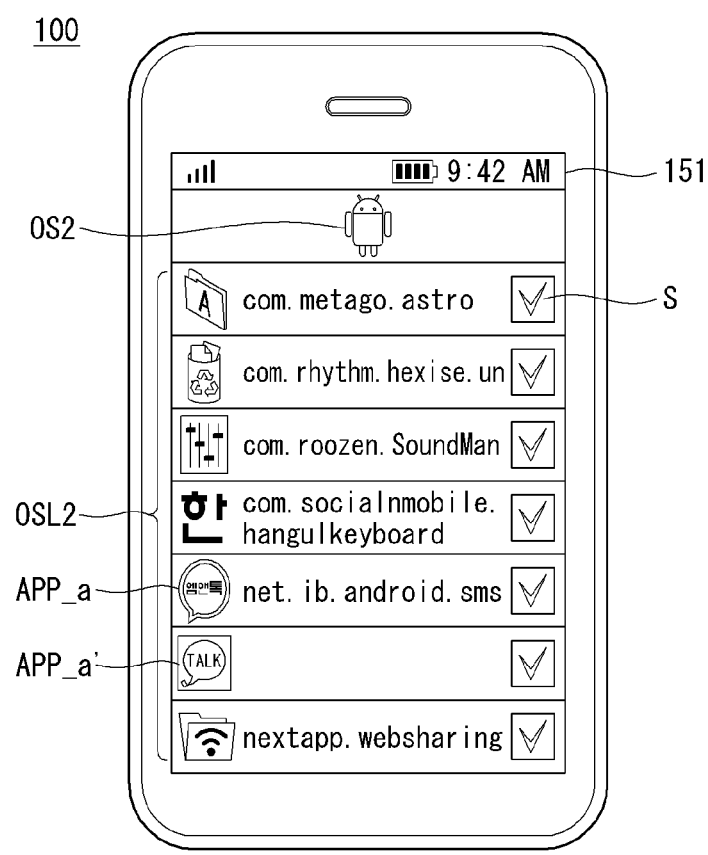

Referring to FIG. 6a, upon receipt of an input for selecting any one of the at least one second operating system through the menu screen 31 illustrated in FIG. 5, the controller 180 can search, among the first applications, at least one second application executable on the selected second operating system and display it on the display unit 151 (S140).

The controller 180 can provide a list OSL2 of the searched at least one second application.

Meanwhile, the controller 180 may include, among the applications executable on the second operating system, the same application as the first applications and at least one application similar to, though not the same as, the first applications in the list OSL2 of the second applications and display them.

Referring to FIG. 6a, for example, a message application "M&Talk", among the first applications based on the first operating system (iOS), can be provided in the second operating system (Android) as well. Accordingly, the controller 180 can display M&Talk application (APP_a) in the second application list OSL2. Further, the controller 180 can display Kakao Talk application (APP_b), too, which is similar to the M&Talk application (APP_a) and executable on the second operating system, in the second application list OSL2.

Figure 6B:
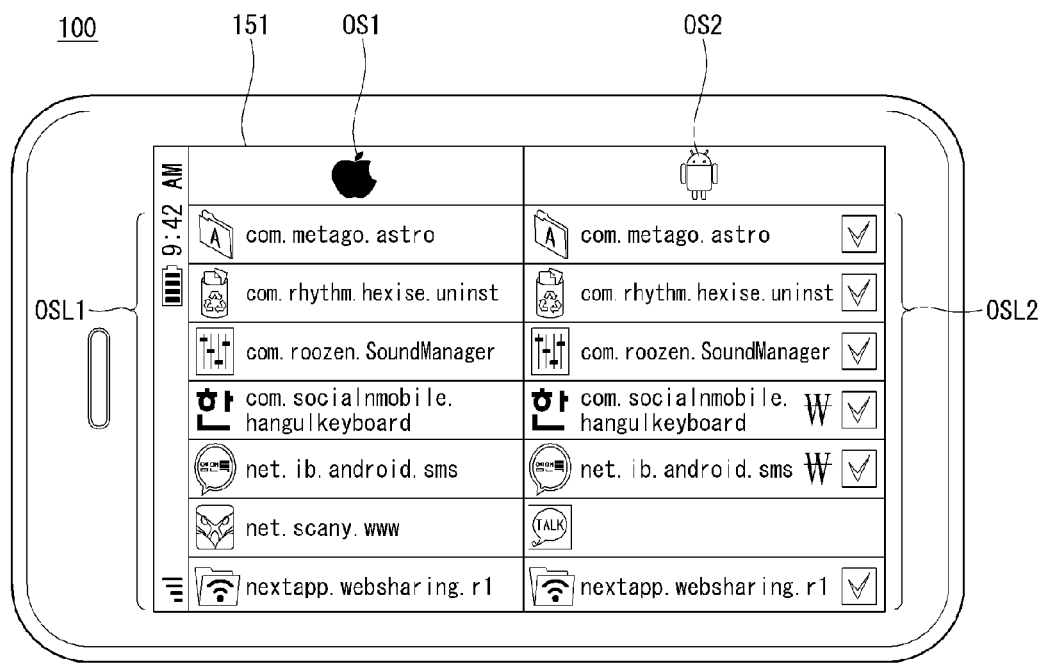

Referring to FIG. 6b, the controller 180 can display the second application list OLS2 on a single screen, along with the first application list OSL1. For example, the first application list OSL1 can be displayed at the left side of the display unit 151, and the second application list OLS2 containing the second applications respectively corresponding to the applications included in the first application list OSL1 can be displayed at the right side of the display unit 151.

Accordingly, it is possible to see at a glance whether any application executable on the second operating system is present or not among the first applications.

Figure 7:
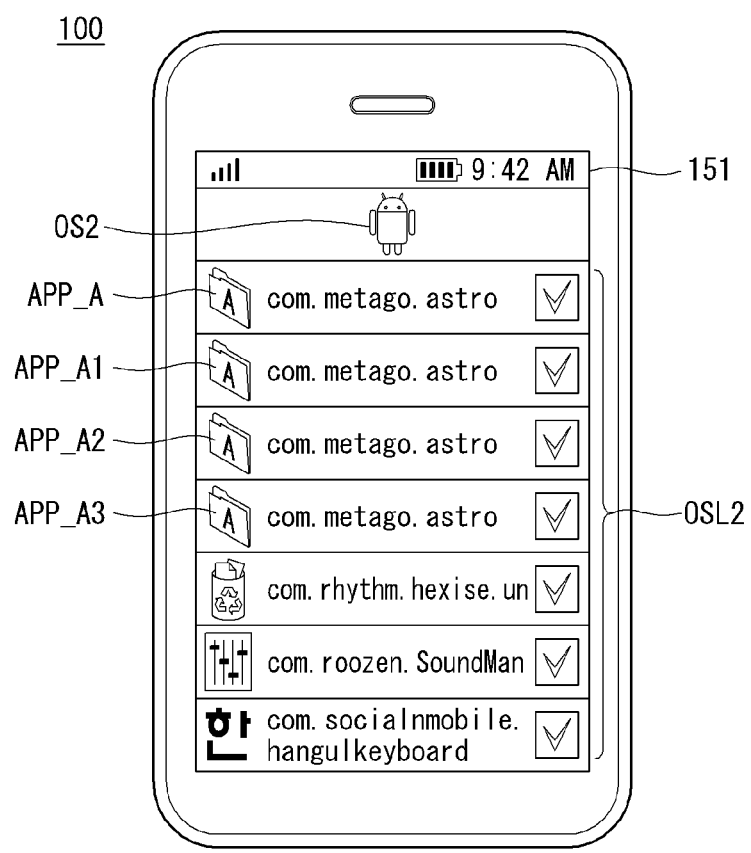

Referring to FIG. 7, the controller 180 can align and display the same application (APP_A) as the first application and an application (APP_A1, APP_A2, APP_3) similar to, though not the same as, the first application according to given criteria. For example, if the application similar to the first application is plural, the controller 180 can align and display them by similarity, rating, popularity, etc.

Meanwhile, according to the method of controlling a mobile terminal according to one exemplary embodiment of the present invention, information associated with a searched second application can be displayed on the display unit 151.

Figure 8:
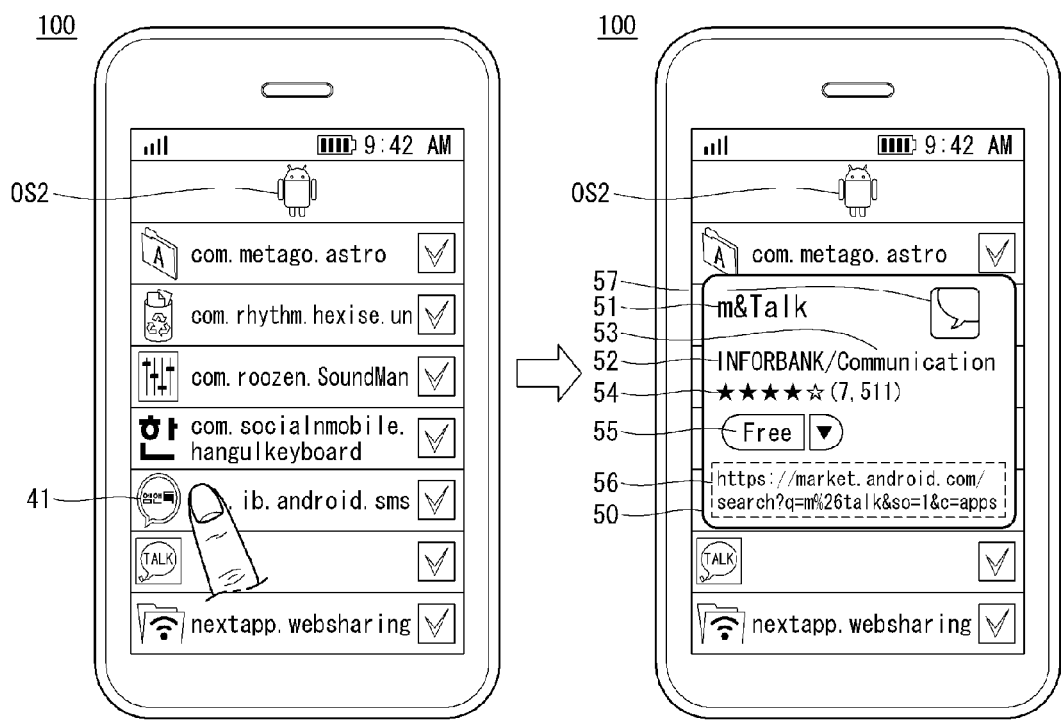

Referring to FIG. 8, for example, when any one of the at least one second application is selected, the controller 180 can display information associated with the selected second application 41 on the display unit 141.

The information associated with the second application may include at least one of the name 51 of an application, application developer information 52, application classification 53, preference 52, charging information 55, information on web pages from which the application can be downloaded, and an icon 57 for identifying the application.

Moreover, the controller 180 can store the second application list containing the searched second application in the memory 160.

Figure 9:
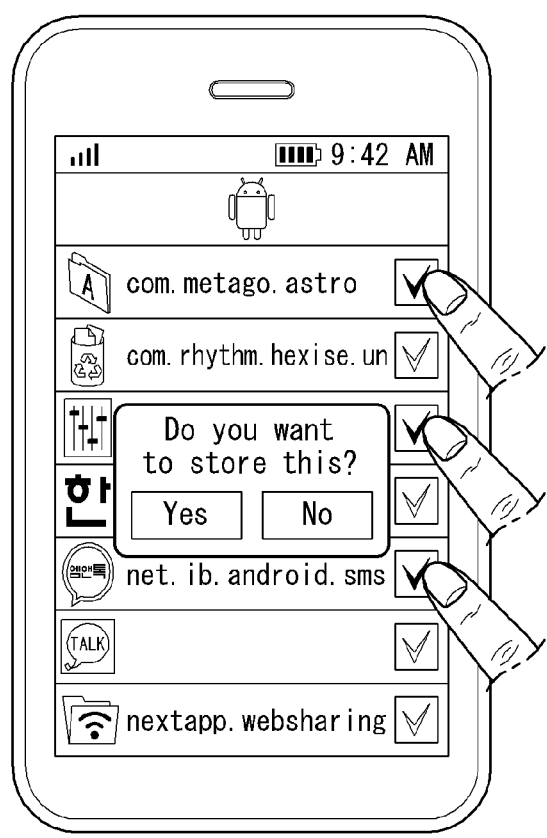

Referring to FIG. 9, for example, the controller 180 can separately store user-selected items from the second application list OSL2.

According to the method of controlling a mobile terminal according to the present invention, the stored second application or the second application list can be recommended to others.

Figure 10:
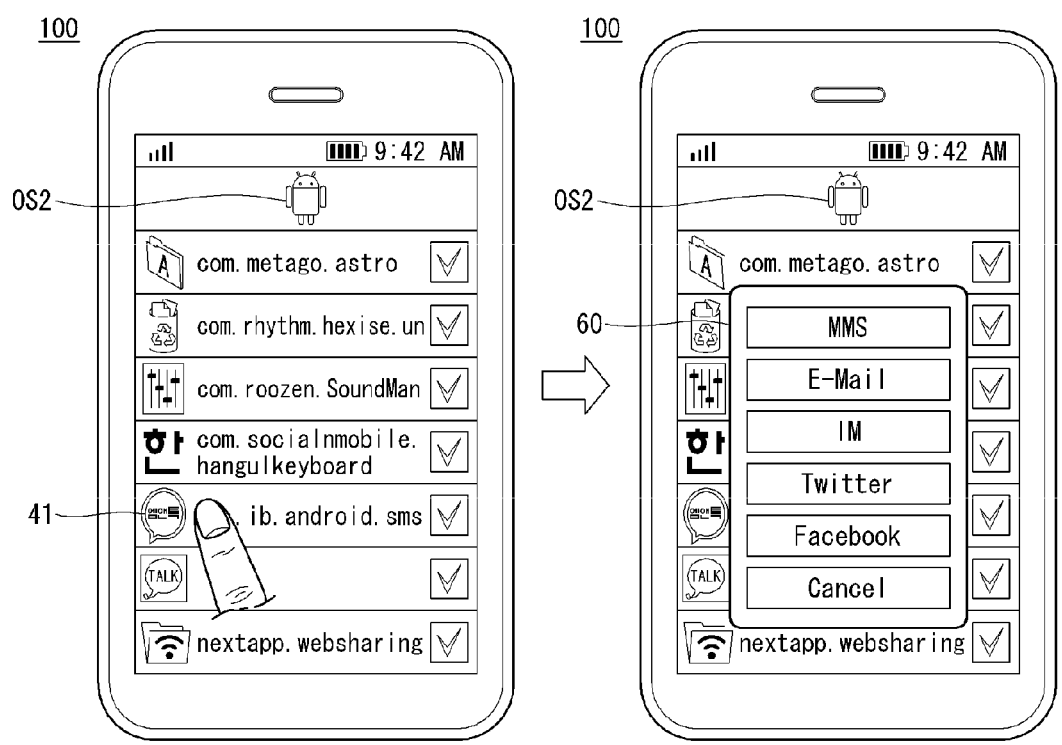

Referring to FIG. 10, for example, when any one of the at least one second application is selected, the controller 180 can recommend to others the second application to others via MMS, E-mail, IM (Instance Messenger Service), and social network services (e.g., Twitter and Facebook).

When at least one of the at least one second application is selected, the controller 180 can transmit a recommendation message recommending the selected at least one second application 41 to an external device based on the second operating system.

The recommendation message may contain a second application installation file or downloadable link information.

Accordingly, having received the recommendation message, the external device can install the second application in a terminal based on the second operating system without the process of searching and downloading an application, by selecting the second application installation file contained in the received recommendation message.

The second application installation file contained in the recommendation message may be a file for installing the second application in the external device as soon as the external device receives the recommendation message.

Having received the recommendation message, the external device can download the second application by accessing the web page providing the second application according to the link information contained in the recommendation message.

Meanwhile, the mobile terminal 100 based on the first operating system can receive an application recommendation request message from external devices (10a and 10b of FIG. 1) based on the second operating system.

Figure 11A:
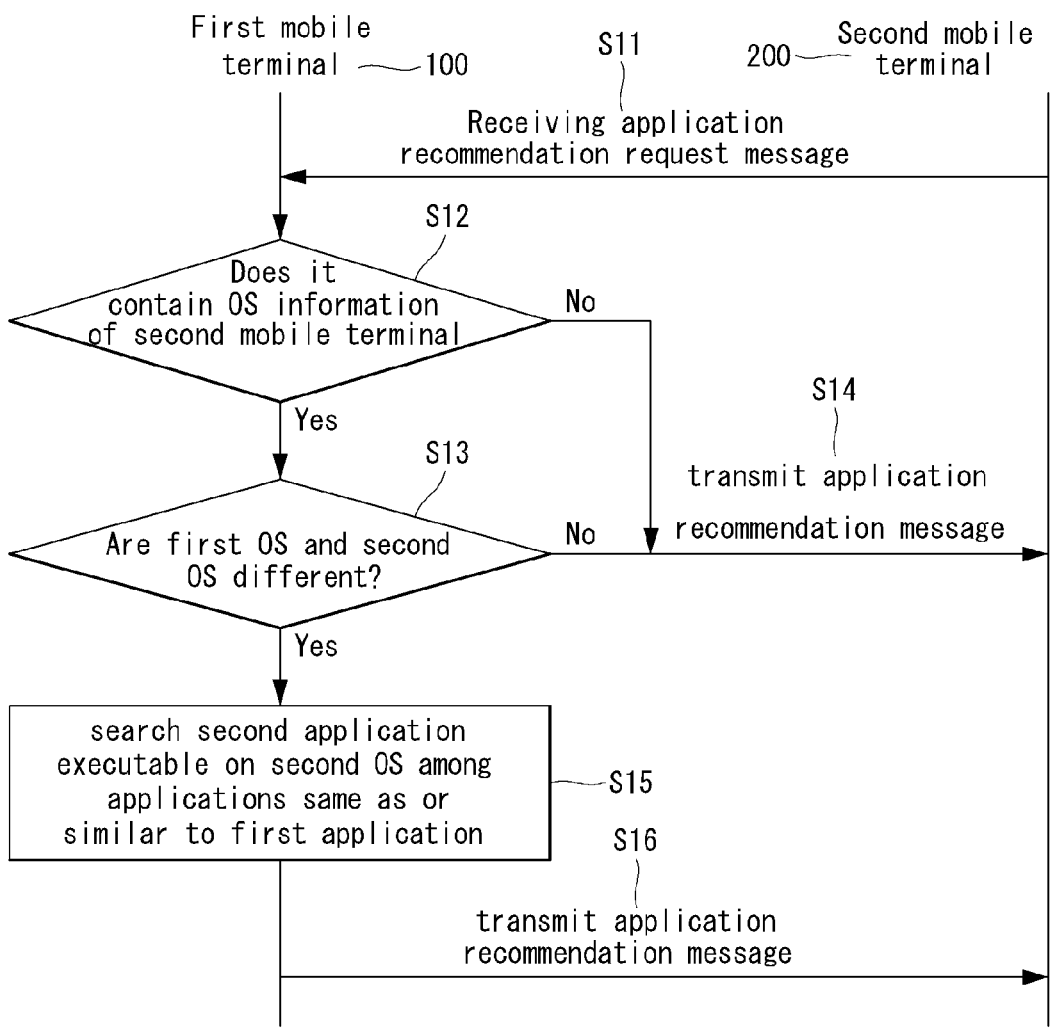
FIG. 11*a* is a flowchart of a method of controlling a mobile terminal according to one exemplary embodiment of the present invention.
Figure 11B:
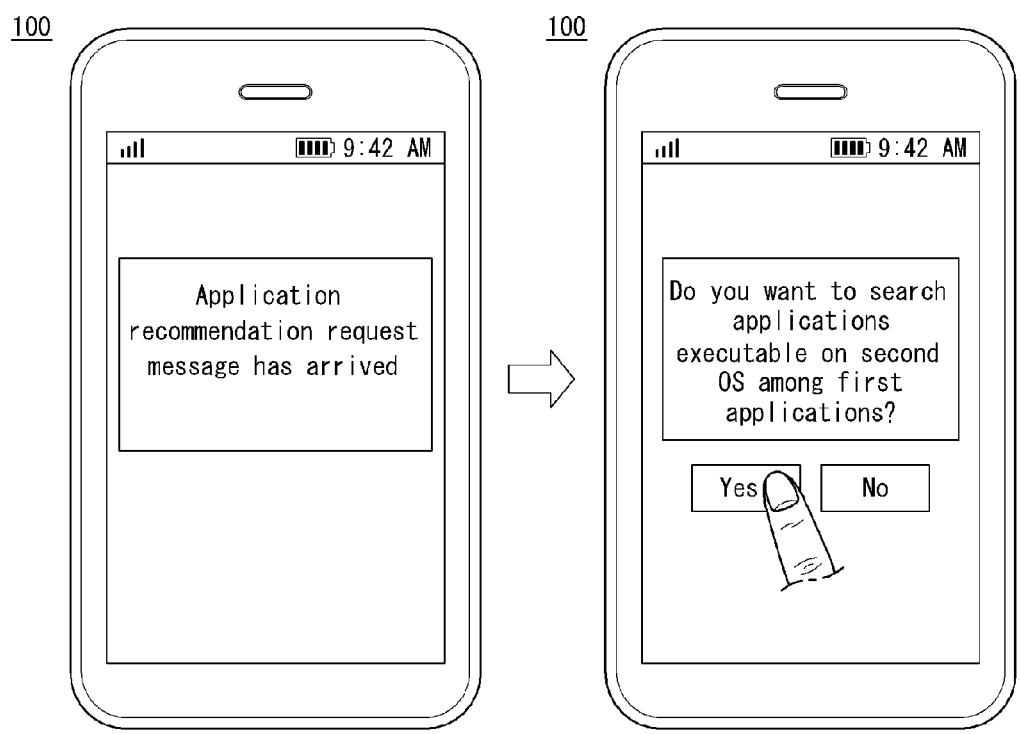
FIG. 11*b* shows the screen of the mobile terminal in accordance with an implementation of the exemplary embodiment shown in FIG. 11*b*.

FIG. 11a is a flowchart of a method of controlling a mobile terminal according to one exemplary embodiment of the present invention. FIG. 11b shows the screen of the mobile terminal in accordance with an implementation of the exemplary embodiment shown in FIG. 11b.

Referring to FIGS. 11a and 11b, a first mobile terminal based on a first operating system can receive an application recommendation request message from an external electronic device (for example, a second mobile terminal 200) (S11).

The operating system for running the second mobile terminal 200 may be the same first operating system as the first mobile terminal 100 or a second operating system different from the first operating system.

The application recommendation request message may contain information associated with the second operating system for running the second mobile terminal 200, information about at least one application installed in the second mobile terminal 200, and so on. Moreover, it may contain a message requesting information associated with the installation of a particular application not installed in the second mobile terminal 200.

More specifically, the application recommendation request message may contain the name of the operating system for running the second mobile terminal, version information of the operating system, the name of a requested application, developer, version, installation file UR, service type (free of charge/charged), price, list of installation files, and other detailed information.

The first mobile terminal 100 can check whether the information associated with the operating system of the second mobile terminal is contained in the application recommendation request message in response to the application recommendation request message received from the second mobile terminal 200 (S12).

As a result of checking, if no information associated with the operating system of the second mobile terminal 200 Is contained the application recommendation request message (S12: No), the first mobile terminal 100 can transmit an application recommendation message for recommending an application installed in the first mobile terminal 100 (S14). In other words, the first mobile terminal 100 may create a list of first applications based on the first operating system and transmit it to the second mobile terminal 200. With the application recommendation message to be transmitted to the second mobile terminal 100, an application list of at least one first application and detailed information (e.g., installation information, version information, installation file URL, developer information, etc.) of the applications in the application list can be displayed on the display unit 151.

Also, if no information associated with the operating system of the second mobile terminal 200 Is contained the application recommendation request message (S12: No), the first mobile terminal 100 can transmit a message requesting information about the operating system for running the second mobile terminal 200 to the second mobile terminal 200.

As a result of checking, if the operating system for running the second mobile terminal 200 is a second operating system different from the first operating system (S13), the controller 180 searches a second application executable on the operating system for running the second mobile terminal 200 among the first operating system-based first applications installed in the first mobile terminal 100 (S15).

Thereafter, the first mobile terminal 100 can transmit an application recommendation message containing a search result for the second application to the second mobile terminal 200 (S16).

The application recommendation message transmitted to the second mobile terminal 200 may contain, as described above, second application information corresponding to each of the at least one first application, for example, installation file information, URL providing an installation file, and so on.

In the second mobile terminal 200 that receives the application recommendation message from the first mobile terminal 100, at least one second application, recommended based on the second application-related information contained in the application recommendation message, can be installed.

The foregoing description has been made with respect to an example in which at least one second application executable on the second operating system (e.g., Android) different from the first operating system is searched among at least one application installed in the mobile terminal 100 based on the first operating system (e.g., iOS) and displayed on the display unit 151.

Moreover, the description has been made with respect to an example of transmitting a second application recommendation message to recommend the second application displayed on the display unit 151 to others.

In what follows, a mobile terminal and a method of controlling the mobile terminal according to another exemplary embodiment of the present invention will be described.

Figure 12:
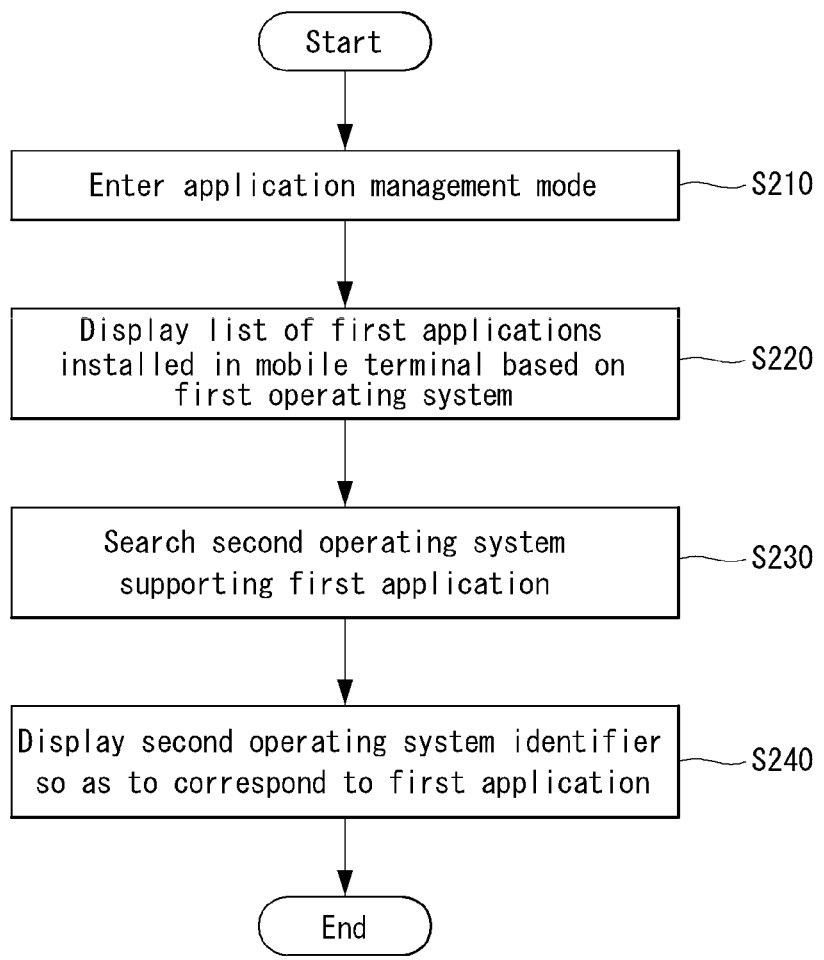
FIG. 12 is a flowchart for explaining a method of controlling a mobile terminal according to one exemplary embodiment of the present invention.
Figure 13:
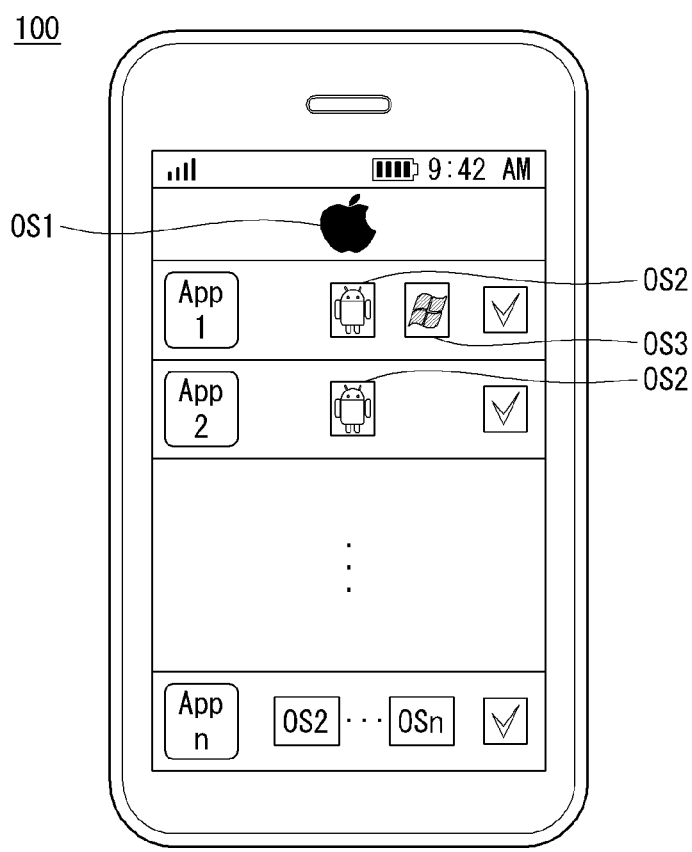
FIGS. 13 to 15 are views showing one example of the method of controlling a mobile terminal according to the exemplary embodiment of FIG. 12.
Figure 14:
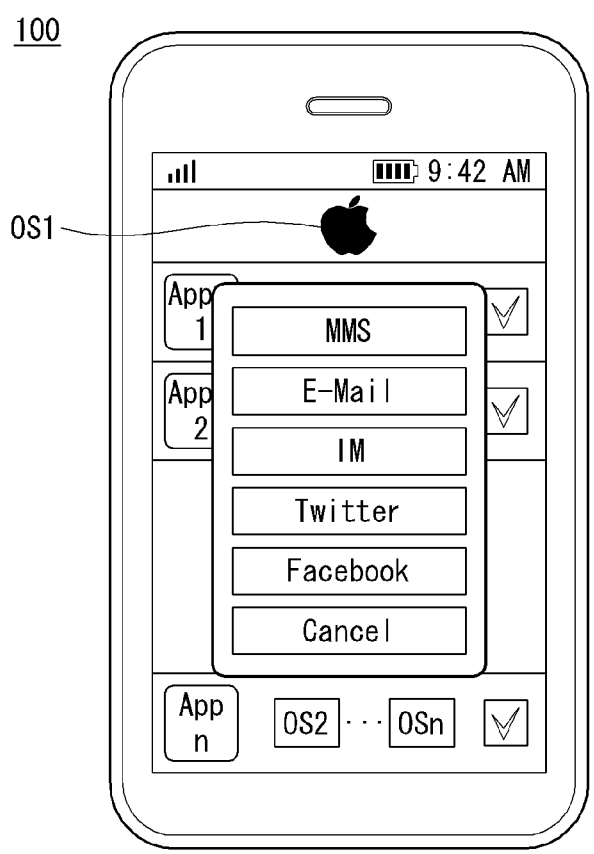
Figure 15:
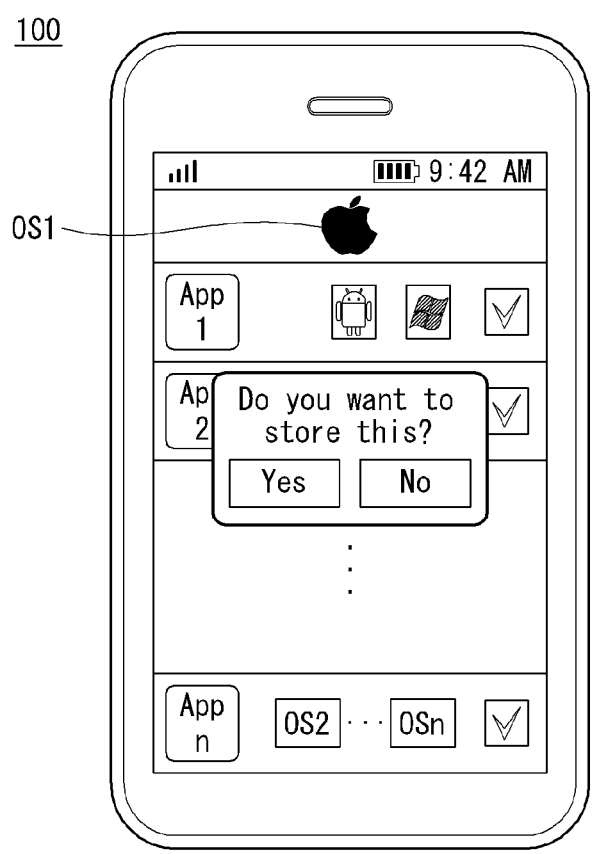

FIG. 12 is a flowchart for explaining a method of controlling a mobile terminal according to one exemplary embodiment of the present invention. FIGS. 13 to 15 are views showing one example of the method of controlling a mobile terminal according to the exemplary embodiment of FIG. 12. This controlling method is performed under the control of the controller 180.

Referring to FIG. 12, the controller 180 can enter the application management mode (S210).

The controller 180 can provide and display all the applications installed in the current mobile terminal 100 as a single list on the display unit 151 in the application management mode (S220). That is, the controller 180 can display, on the display unit 151, a list OSL1 of the first applications installed in the mobile terminal 100 based on the first operating system upon receipt of a specific user operation.

The controller 180 can search, among the first applications, a second application executable in a second operating system different from the first operating system (S230). For example, the first operating system may be iOS, and the second operating system Android. The controller 180 can search applications executable on Android among the iOS-based first applications installed in the mobile terminal 100.

To search an application, the controller 180 can display, on the display unit 151, a menu screen for selecting any one of the at least one second operating system (See FIG. 5).

FIG. 13 is an illustrative view showing a list of at least one first application installed in the first operating system-based mobile terminal 100 and a second operating system identifier mapped to the first application list.

The memory 160 of the mobile terminal 100 can store the first operating system (for example, iOS) and the first applications executable on the first operating system. The controller 180 can display the first application list on the display unit 151, and map and display the search result to each of the applications installed in the first application list.

Accordingly, the second operating system, other than the first operating system, that supports each application can be easily identified. Referring to FIG. 13, for example, it can be seen that Application 1 (APP 1) executable on iOS can be supported on an Android (OS2) operating system and a Windows Mobile (OS3) operating system as well. Moreover, it can be seen that Application w executable on iOS can be supported on an Android (OS2) operating system as well.

Meanwhile, the controller 180 can recommend a particular one of the first applications to others. For example, any one of the first applications installed in the mobile terminal 100 based on the first operating system can be recommended to an external electronic device based on the second operating system.

Moreover, the mobile terminal 100 based on the first operating system can receive an application recommendation request message from the external electronic device based on the second operating system.

In addition, upon receipt of the request message, the mobile terminal can enter the application management mode to recommend an application.

In the application mode, the controller 180 can search a second application, and transmit a search result application recommendation message to the external electronic device.

As described above, as a result of searching, if the same application as the first application executable on the second operating system does not exist, the controller 180 can search an application similar to the first application and include this application in the second application list and provide it.

The recommendation message may contain an installation file for installing the first application in an external electronic device based on the second operating system or link information for downloading a recommended application.

Referring to FIG. 14, to recommend the application, the controller 180 can transmit an application recommendation message to an external electronic device via message transmission means such as MMS, E-mail, IM (Instance Messenger Service), and social network services (e.g., Twitter and Facebook).

Moreover, referring to FIG. 15, the controller 180 can search at least one second application executable on the second operating system among at least one first application executable on the first operating system, and store the search result.

As shown in FIG. 14, the controller 180 can transmit the stored search result to the external electronic device based on the second operating system through the message transmitting means.

Although the foregoing description has been made with respect to an example in which the mobile terminal 100 based on the first operating system recommends an application to the external electronic device based on the second operating system, the present invention is not limited thereto. For example, the mobile terminal 100 based on the first operating system searches and stores the first applications installed in the mobile terminal 100, and the list of the first application list to another external electronic device based on the first operating system such that the another external electronic device based on the first operating system has the same application configuration as the first applications installed in the mobile terminal 100.

Meanwhile, at least one program for executing the method of controlling a mobile terminal according to one exemplary embodiment of the present invention can be stored in an electronic device that can be connected to the mobile terminal via a predetermined interface (e.g., wired or wireless interface), as well as in the mobile terminal.

Figure 16:
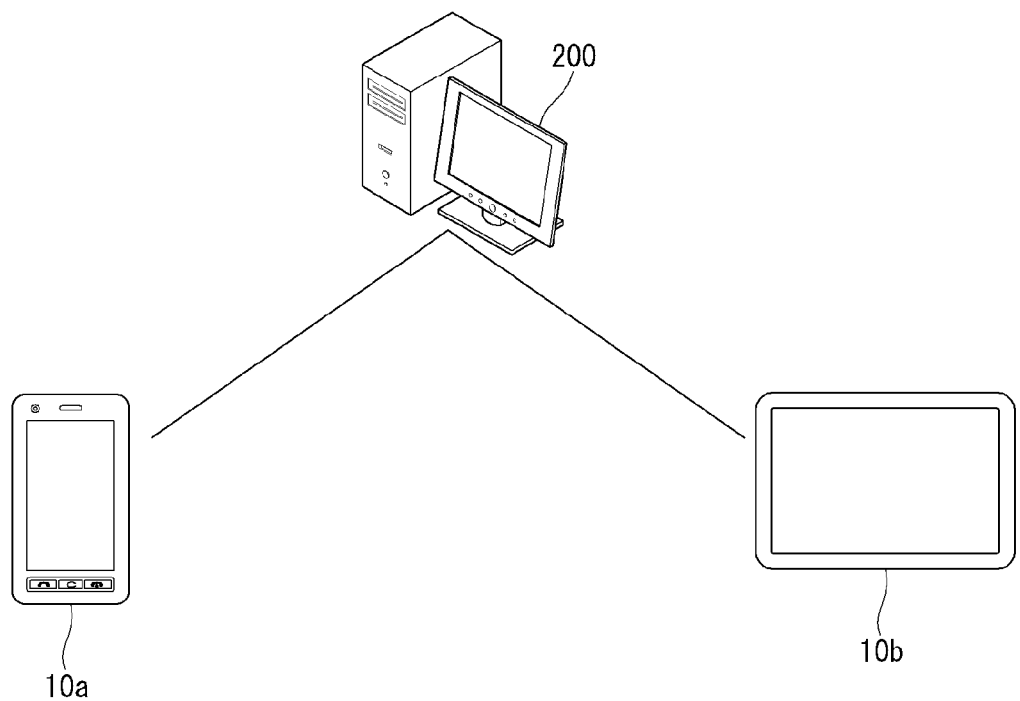
FIG. 16 is a schematic system configuration diagram for explaining a method of controlling an electronic device according to one exemplary embodiment of the present invention.

FIG. 16 is a schematic system configuration diagram for explaining a method of controlling an electronic device according to one exemplary embodiment of the present invention.

Referring to FIG. 16, a system for implementing the method of controlling an electronic device according to one exemplary embodiment may include an electronic device 200 and external devices 10a and 10b that are connected to the electronic device 200 in a wired or wireless manner to perform a data communication.

The electronic device 200 may be a desktop PC or laptop.

If the first external device 10a based on the first operating system, between the external devices 10a and 10b, is connected to the electronic device 200, the first external device 10a and the electronic device 200 can be synchronized first of all.

The external devices 10a and 10b and the electronic device 200 may be connected in a wired manner via a USB connection port, or connected in a wireless manner by configuring a short-range communication network.

Once the synchronization between the external devices 10a and 10b and the electronic device 200 is completed, the electronic device 20 can search first applications installed in the first external device 10a, and create a list of the first applications.

Moreover, the electronic device 200 can search, among the first applications, at least one application executable on a second operating system different from the first operating system supporting the first external device 10a.

The electronic device 200 may create a list of applications executable on various operating systems by performing a web search for the at least one application, or by means of an application-related database stored in an internal memory.

The electronic device 200 can store a second application executable on the second operating system among the first applications.

Afterwards, when the second external device 10b based on the second operating system is connected to the electronic device 200, the electronic device 200 can perform synchronization with the second external device 10b as described above.

Upon completion of the synchronization, the electronic device 200 can adapt the first application list stored in the first external device 10a to the second external device 10b. That is, the first applications can be installed in the second external device 10b by delivering information associated with the first applications.

The information associated with the first applications delivered to the second external device 10b from the electronic device 200 can contain a first application execution file executable on the second operating system, information on web pages providing the first applications, and so on.

The following description will be given with reference to a flowchart of the method of controlling an electronic device that can be implemented on the system shown in FIG. 16.

Figure 17:
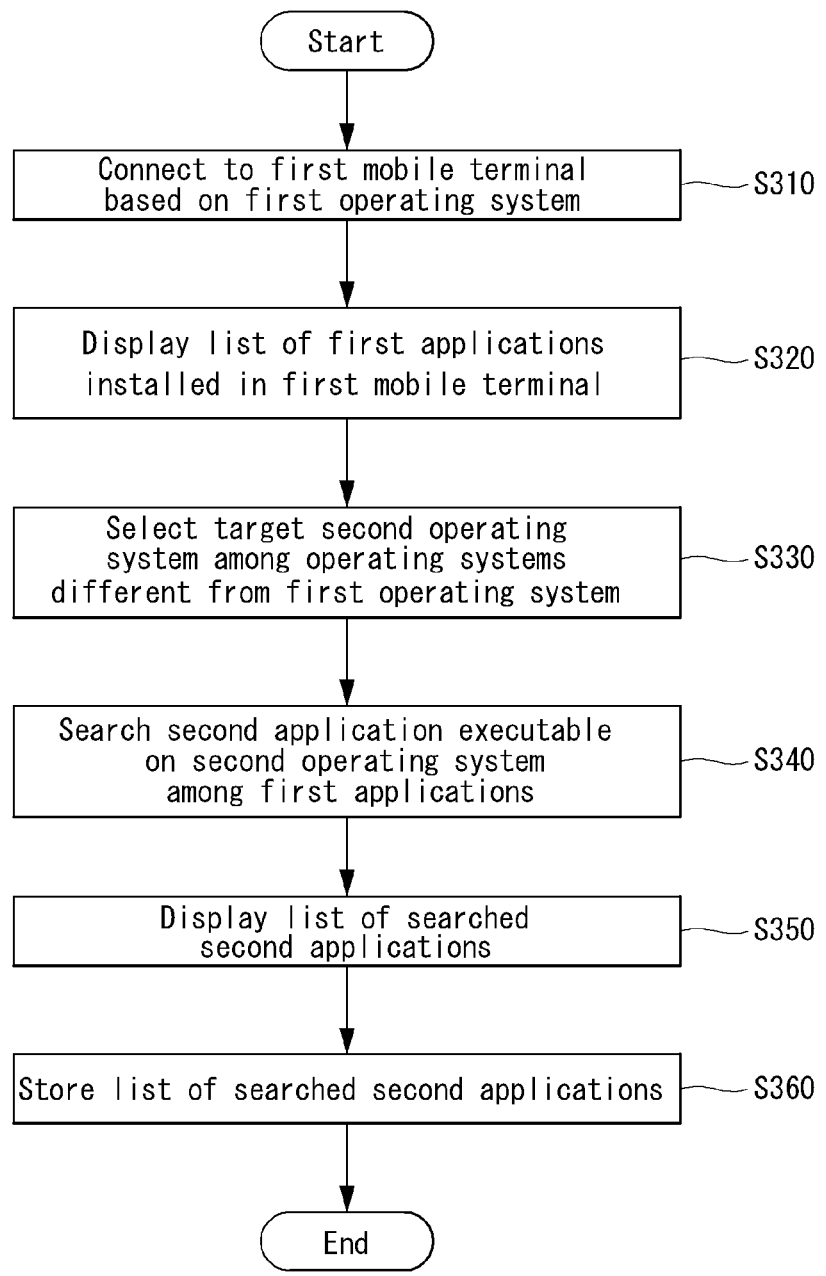
FIGS. 17 and 18 are flowcharts of a method of controlling an electronic device according to one exemplary embodiment of the present invention.
Figure 18:
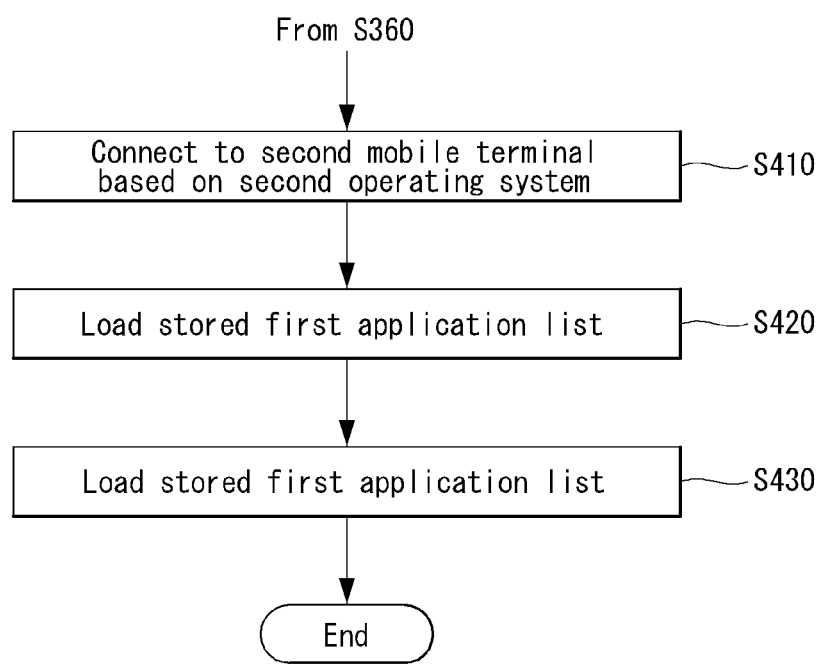

FIGS. 17 and 18 are flowcharts of a method of controlling an electronic device according to one exemplary embodiment of the present invention.

Referring to FIGS. 16 and 17, the electronic device 200 is connected to the first mobile terminal 10a based on the first operating system (S310). For example, the electronic device 200 may be a PC, and the first mobile terminal 10a may be connected to the PC.

The first mobile terminal 10a may be connected to the electronic device 200 in a wired or wireless manner. A wired connection can be made via a USB port for a wired connection, and a wireless connection can be made via short-range communication.

Upon completion of the connection of the first mobile terminal 10a, the electronic device 200 can perform synchronization with the first mobile terminal 10a.

Once the device synchronization is completed, the electronic device 200 searches at least one first application stored in the first mobile terminal 10a and executable on the first operating system, and display a first application list containing the at least one first application on the display unit (S320).

Thereafter, the electronic device 200 receives an input for selecting a desired second operating system from among operating systems different from the first operating system (S330), and searches a second application executable on the selected second operating system among the first applications (S340).

The second application can be searched by web searched through the web or through the database stored in the electronic device 200.

The web search may involve performing the application search by accessing the web page providing the application.

Also, the database search may involve performing a search in the database storing information associated with a predetermined application (application program) available for each operating system. The information associated with the application may contain the name of an operating system, developer, version, installation date, installation file UR, service type (free of charge/charged), price, list of installation files, and other detailed information.

Once the search for a second application is completed, the electronic device 200 can display a list of searched second applications on the display unit (S350).

Moreover, the list of the second applications searched in response to a user request can be stored (S360).

The list of the second applications stored in the electronic device 200 can be adapted to the second mobile terminal 10b having a different operating system from that of the first mobile terminal 10a. The following description will be given with reference to FIG. 18.

Referring to FIGS. 16 and 18, in step S360, the electronic device 200 can store the list of the first applications installed in the first mobile terminal 10a.

Thereafter, when the second mobile terminal 10b is connected to the electronic device 200, the electronic device 200 performs synchronization with the second mobile terminal 10b, and reads the list of the first applications stored in the memory of the electronic device 200 (S420), and adapts it to the second mobile terminal 10b.

The electronic device 200 can deliver the first application list to the second mobile terminal 10b. Alternatively, the electronic device 200 can deliver information associated with the installation of the first applications to the second mobile terminal 10b. Alternatively, the electronic device 200 can control the first application to be installed in the second external device 10b by delivering the first application execution file to the second external device 10b.

Figure 19:
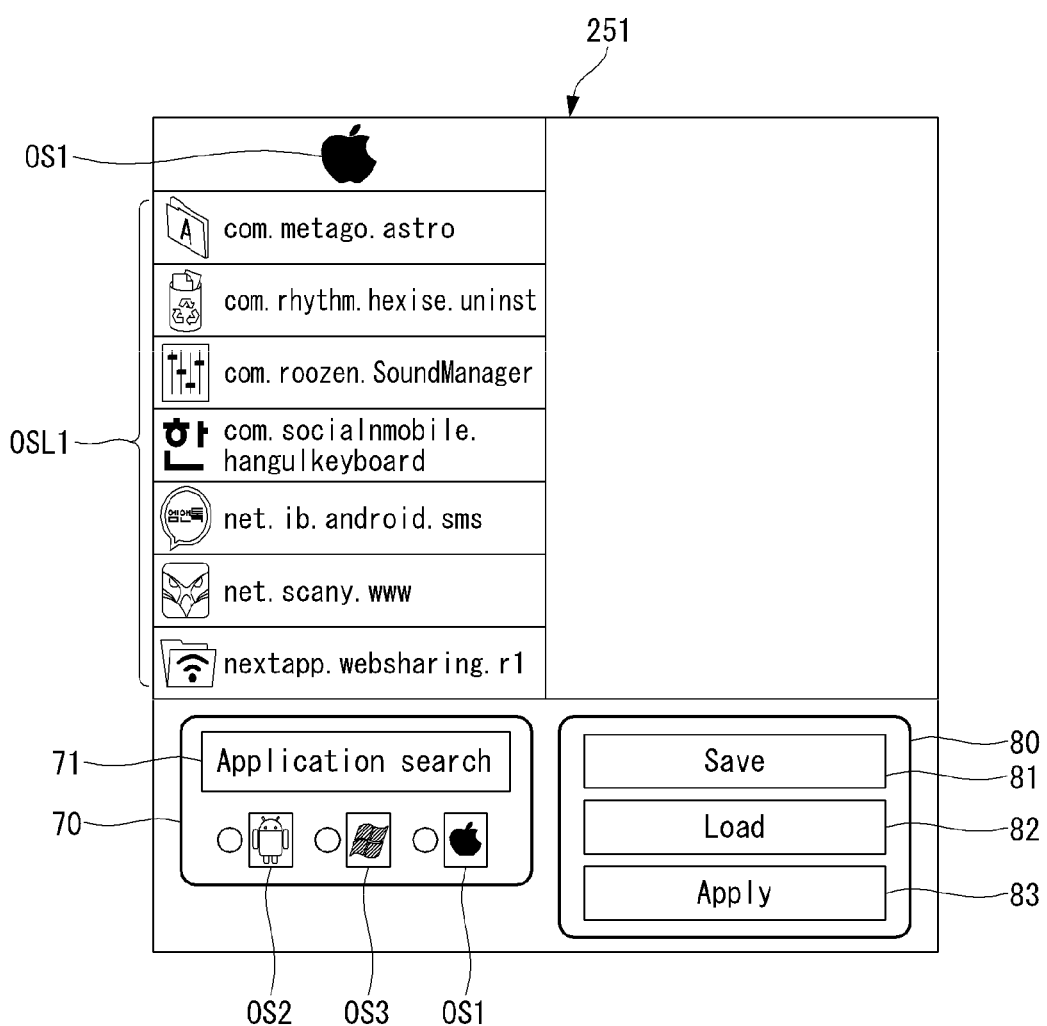
FIGS. 19 and 20 are views showing one example of the method of controlling the electronic device shown in FIG. 17.
Figure 20:
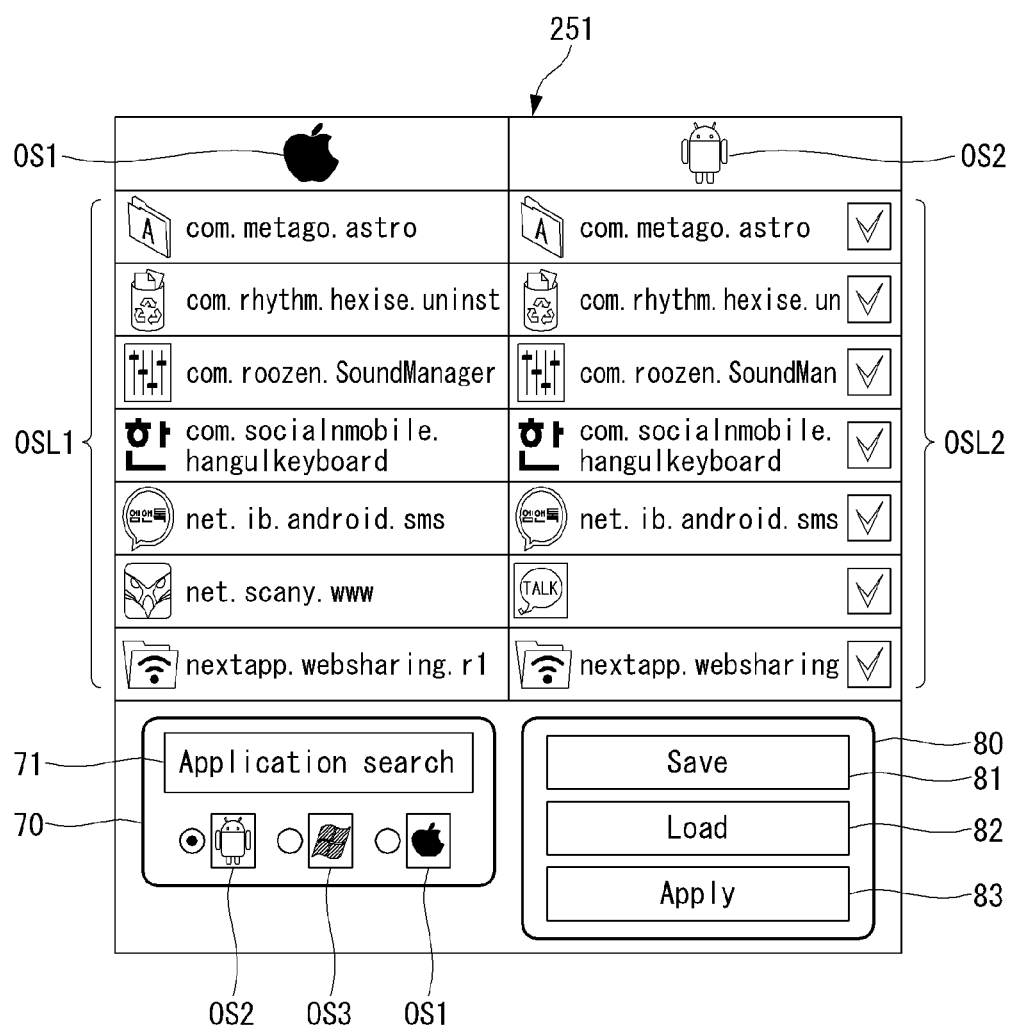

FIGS. 19 and 20 are views showing one example of the method of controlling the electronic device shown in FIG. 17.

Referring to FIGS. 19 and 20, the electronic device 100 can display, on the display unit, the list OSL1 of the first applications installed in the first mobile terminal 10a based on the first operating system OS1 (for example, iOS).

When one is selected from among at least one operating system OS1, OS2, and OS3 provided to a menu window 70 for searching a different operating system, at least one second application executable on the selected operating system can be searched among the first applications.

Moreover, the electronic device 200 can manage searched applications by save 81, load 82, and apply 83 functions provided through a menu window 80 for managing the searched applications.

For example, an application executable on the second operating system is searched among the first applications executable on the first operating system, and then the search result is stored. The stored search result can be applied to various types of terminals that are to be connected to the electronic device 200 by the load 82 and apply 83 functions.

According to the mobile terminal and the method of controlling the mobile terminal according to one exemplary embodiment, it is possible to provide a user interface for efficiently managing applications so as to be appropriate for various operating systems. When switching between operating systems in a certain electronic device, it can be checked whether an application installed based on the current operating system is executable in the target operating system. Moreover, an application currently in use can be easily recommended to a user who uses an electronic device running on a different operating system.

Further, according to the method of controlling an electronic device according to one exemplary embodiment of the present invention, the operating system of the electronic device can be switched from the first operating system to the second operating system. The electronic device is able to store an application executable on the target operating system, among the applications installed before the switch between the operating systems, and installation information of the application. Therefore, even the application before the switch between the operating systems can be easily adapted to the new operating system.

The method for providing information of the mobile terminal according to embodiments of the present invention may be recorded in a computer-readable recording medium as a program to be executed in the computer and provided. Further, the method for controlling a mobile terminal and the method for displaying an image of a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD±ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the meets and bounds of the claims, or equivalents of such metes and bounds are therefore intended to be embraced by the appended claims.

What is claimed is:

1. A mobile terminal, comprising:
a display unit configured for displaying information;
a memory configured for storing a first mobile operating system and a first application executable in the first mobile operating system; and
a controller configured for:
controlling the display unit to display a list comprising the first application, the first application installed in the mobile terminal;
controlling the display unit to display a menu, the menu including at least one icon indicating a second mobile operating system;
selecting an icon of the at least one icon of the displayed menu in response to an input, the selected icon corresponding to the second mobile operating system;
searching for a second application corresponding to the first application and executable in the selected second operating mobile system, the second application being identical or similar to the first application; and
controlling the display unit to display the second application, wherein the second mobile operating system is different from the first mobile operating system.

2. The mobile terminal of claim 1, wherein the second application comprises:
a first of the second application that is identical to a corresponding first of the first application and executable in both the first mobile operating system and a first of the second mobile operating system; and
a second of the second application that is similar to a corresponding second of the first application,
wherein the second of the second application is executable in the first of the second mobile operating system, and
wherein the second of the second application is not executable in the first mobile operating system.

3. The mobile terminal of claim 2, wherein the controller is further configured to control the display unit to display the second of the second application aligned with the second of the first application.

4. The mobile terminal of claim 1, wherein the controller is further configured for:
recognizing a selection of one of the second application; and
controlling the display unit to display information related to the selected one of the second application.

5. The mobile terminal of claim 4, wherein the information related to the selected one of the second application comprises descriptive information, pricing information, assessment information, or information on a web page from which the selected one of the second application can be downloaded.

6. The mobile terminal of claim 1, wherein the controller is further configured for controlling the memory to store a list containing the second application.

7. The mobile terminal of claim 1, further comprising:
a communication unit configured for transmitting and receiving information, wherein the controller is further configured for:
recognizing a selection of one of the second application; and
controlling the communication unit to transmit a recommendation message recommending the selected one of the second application to an external device,
wherein the external device is configured to operate using the second mobile operating system.

8. The mobile terminal of claim 7, wherein the controller is further configured for:
controlling the communication unit to receive an application recommendation request message from the external device,
wherein the recommendation message is transmitted to the external device in response to the received application recommendation request message.

9. The mobile terminal of claim 7, wherein the recommendation message contains an installation file for the selected one of the second application or downloadable link information for the selected one of the second application.

10. A mobile terminal, comprising:
a display unit configured for displaying information;
a memory configured for storing a first mobile operating system and a first application executable in the first mobile operating system; and
a controller configured for:
controlling the display unit to display a list comprising the first application, the first application installed in the mobile terminal;
searching for a second mobile operating system configured for supporting the first application; and
controlling the display unit to display an identifier indicating the searched second mobile operating system as being capable of supporting the first application,
wherein the second mobile operating system is different from the first mobile operating system.

11. The mobile terminal of claim 10, further comprising a communication unit configured for transmitting and receiving information,
wherein the controller is further configured for:
recognizing an input for recommending the first application; and
controlling the communication unit to transmit a recommendation message recommending the first application to an external device,
wherein the external device is configured to operate using the second mobile operating system, and
wherein the recommendation message contains an installation file for installing the first application into the external electronic device or downloadable link information for use by the external device to retrieve the first application for installation into the external device.

12. A method for controlling a mobile terminal, the method comprising:
storing a first mobile operating system and a first application that is executable in the first mobile operating system in a memory of the mobile terminal;
displaying a list on a display unit of the mobile terminal, the list comprising the first application, the first application installed in the mobile terminal;
displaying a menu on the display unit, the menu comprising at least one icon indicating a second mobile operating system;
receiving an input for selecting an icon of the at least one icon of the displayed menu, the selected icon corresponding to the second mobile operating system;
searching, via a controller, among the first application for a second application that is executable in the selected second mobile operating system, the second application being identical to or similar to the first application; and
displaying the second application on the display unit,
wherein the second mobile operating system is different from the first mobile operating system.

13. The method of claim 12, further comprising:
receiving a selection of the second application; and
displaying information related to the selected second application on the display unit.

14. The method of claim 13, wherein the information related to the selected second application comprises descriptive information, pricing information, assessment information, or information on a web page from which the selected second application can be downloaded.

15. The method of claim 12, further comprising:
receiving an input for selection of the second application; and
transmitting a recommendation message via a communication unit of the mobile terminal, the recommendation message recommending the selected second application to an external device,
wherein the external device is configured to operate using the second mobile operating system.

16. The method of claim 15, further comprising:
receiving an application recommendation request message from the external device via the communication unit,
wherein the recommendation message is transmitted to the external device in response to the received application recommendation request message.

17. The method of claim 15, wherein the recommendation message contains an installation file for the selected second application or downloadable link information for the selected second application.

18. A method for controlling a mobile terminal, the method comprising:
storing a first mobile operating system and a first application that is executable in the first mobile operating system in a memory of the mobile terminal;
displaying a list on a display unit of the mobile terminal, the list comprising the first application, the first application installed in the mobile terminal;
searching, via a controller, for a second mobile operating system configured for supporting the first application; and
displaying an identifier on the display unit, the identifier indicating that the searched second mobile operating system is capable of supporting the first application,
wherein the second mobile operating system is different from the first mobile operating system.

19. The method of claim 18, further comprising:
receiving an input for recommending the first application; and
transmitting a recommendation message via a communication unit of the mobile terminal, the recommendation message recommending the first application to an external device,
wherein the external device is configured to operate using the second mobile operating system, and
wherein the recommendation message contains an installation file for installing the first application into the external device or downloadable link information for use by the external device to retrieve the first application for installation into the external device.

* * * * *